United States Patent

Yokoyama et al.

[11] Patent Number: 5,821,860
[45] Date of Patent: Oct. 13, 1998

[54] DRIVING CONDITION-MONITORING APPARATUS FOR AUTOMOTIVE VEHICLES

[75] Inventors: Shintaro Yokoyama; Kouichi Kojima, both of Wako, Japan

[73] Assignee: Honda Giken Kogyo Kabushiki Kaisha, Tokyo, Japan

[21] Appl. No.: 859,206

[22] Filed: May 20, 1997

[30] Foreign Application Priority Data

May 20, 1996 [JP] Japan .................................. 8-147904

[51] Int. Cl.⁶ .................................................. G08B 23/00
[52] U.S. Cl. .......................... 340/576; 340/575; 340/439
[58] Field of Search .................................. 340/576, 439, 340/517, 521, 575; 701/41, 45, 59, 65

[56] References Cited

U.S. PATENT DOCUMENTS

| | | | |
|---|---|---|---|
| 4,450,438 | 5/1984 | Seko et al. | 340/576 |
| 4,509,040 | 4/1985 | Seko et al. | 340/576 |
| 4,518,954 | 5/1985 | Seko et al. | 340/576 |
| 4,564,833 | 1/1986 | Seko et al. | 340/576 |
| 4,565,997 | 1/1986 | Seko et al. | 340/576 |
| 4,594,583 | 6/1986 | Seko et al. | 340/576 |
| 4,604,611 | 8/1986 | Seko et al. | 340/576 |
| 4,725,824 | 2/1988 | Yoshioka | 340/575 |
| 5,162,997 | 11/1992 | Takahashi | 364/424.05 |
| 5,285,523 | 2/1994 | Takahashi | 395/22 |
| 5,499,182 | 3/1996 | Ousborne | 364/424.04 |
| 5,642,093 | 6/1997 | Kinoshita et al. | 340/439 |
| 5,694,116 | 12/1997 | Kojima | 340/576 |

FOREIGN PATENT DOCUMENTS

5-85221  4/1993  Japan .

*Primary Examiner*—Thomas J. Mulien, Jr.
*Assistant Examiner*—Toan N. Pham
*Attorney, Agent, or Firm*—Weiner, Carrier, Burt & Esser, P.C.; Joseph P. Carrier

[57] ABSTRACT

A driving condition-monitoring apparatus for an automotive vehicle monitors a driving condition of a driver of the automotive vehicle. At least one of behavior of the vehicle, a driving operation of the driver, and at least one condition of the driver is detected to thereby generate driving condition-indicative data indicative of the driving condition of the driver. It is determined whether the driving condition of the driver is abnormal, based on the driving condition-indicative data generated. When it is not determined that the driving condition of the driver is abnormal, a degree of normality of the driving condition of the driver is determined by inputting a plurality of pieces of the driving condition-indicative data to a neural network. At least one of warning and control of the vehicle is carried out depending on a result of the determination as to whether the driving condition of the driver is abnormal and the degree of normality of the driving condition of the driver.

14 Claims, 7 Drawing Sheets

FIG.3C YAM

FIG.3D DYK

DRIVING CONDITION-MONITORING APPARATUS FOR AUTOMOTIVE VEHICLES

BACKGROUND OF THE INVENTION

1. Field of the Invention

This invention relates to a driving condition-monitoring apparatus for automotive vehicles, which monitors the driving condition of a driver of an automotive vehicle, and takes appropriate measures, e.g. giving warning, depending upon the result of the monitoring.

2. Description of Relevant Art

Conventionally, a driving condition-monitoring apparatus has been proposed e.g. by Japanese Laid-Open Patent Publication (Kokai) No. 5-85221, which estimates a delay in response of a driver of an automotive vehicle and an amount of deviation of the actual position of the vehicle from a reference position of a lane on which the vehicle is traveling, based on an amount of steering of the vehicle performed by the driver and the vehicle speed, and compares the estimated response delay and the estimated deviation amount with respective reference values to be assumed when the driver is in a normal driving condition, to thereby check the driving condition of the driver, e.g. abnormal steering caused by driver dozing or lowered driving ability of the driver resulting from his fatigue.

According to the previously proposed driving condition-monitoring system, however, when the driving condition of the driver is not determined to be abnormal, it is regarded to be normal. Therefore, it is difficult to take appropriate measures to properly cope with various driving conditions of the driver. That is, each driver has his own driving ability, and the driving ability of each individual driver varies with his physical condition. As a result, the above-indicated respective reference values of the estimated response delay and the estimated deviation amount to be assumed when the driver is in a normal driving condition cannot necessarily be proper reference values for all drivers. Therefore, the conventional method of determining an abnormal driving condition of the driver simply by comparing the parameters (response delay and deviation amount) with the respective reference values to be assumed when the driver is in a normal driving condition can only make it possible to cope with a case where the driver's driving condition is extremely degraded.

SUMMARY OF THE INVENTION

It is an object of the invention to provide a driving condition-monitoring apparatus for an automotive vehicle, which is not only capable of accurately determining various driving conditions of the driver but also capable of quickly determining an abnormal driving condition of the driver to thereby enable taking of appropriate measures to cope with same.

To attain the above object, the present invention provides a driving condition-monitoring apparatus for an automotive vehicle, for monitoring a driving condition of a driver of the automotive vehicle.

The apparatus according to the invention is characterized by comprising:

driving condition-detecting means for detecting at least one of behavior of the vehicle, a driving operation of the driver, and at least one condition of the driver to thereby generate driving condition-indicative data indicative of the driving condition of the driver;

first driving condition-determining means for determining whether the driving condition of the driver is abnormal, based on the driving condition-indicative data generated by the driving condition-detecting means;

second driving condition-determining means for determining a degree of normality of the driving condition of the driver, by inputting a plurality of pieces of the driving condition-indicative data to a neural network when the first driving condition-determining means does not determine that the driving condition of the driver is abnormal; and control means for carrying out at least one of warning and control of the vehicle depending upon a result of the determination by the first driving condition-determining means and the degree of normality of the driving condition of the driver determined by the second driving condition-determining means.

Preferably, the first driving condition-determining means determines whether the driving condition of the driver is abnormal based on a distribution of a plurality of pieces of the driving condition-indicative data.

Preferably, when the first driving condition-determining means does not determine that the driving condition of the driver is abnormal, the first driving condition-determining means further determines whether the driving condition of the driver is normal, based on the driving condition-indicative data generated by the driving condition-detecting means, the determination of the degree of normality of the driving condition of the driver by the second driving condition-determining means being inhibited when the first driving condition-determining means has determined that the driving condition of the driver is either definitely normal or definitely abnormal.

More preferably, the first driving condition-determining means forms pattern data indicative of the distribution of the plurality of pieces of the driving condition-indicative data, and compares the pattern data thus formed with predetermined abnormality-indicative pattern data indicative of respective abnormal driving conditions of the driver and predetermined normality-indicative pattern data indicative of respective normal driving conditions of the driver, the first driving condition-determining means determining that the driving condition of the driver is abnormal when the formed pattern data is identical with any of the predetermined abnormality-indicative pattern data, and determining that the driving condition of the driver is normal when the formed pattern data is identical with any of the predetermined normality-indicative pattern data.

Preferably, the second driving condition-determining means calculates a driving condition-indicative parameter by the neural network, based on the driving condition-indicative data and compares the driving condition-indicative parameter with a plurality of reference values to thereby determine which of an abnormal region, an intermediate region, and a normal region the degree of normality of the driving condition of the driver belongs.

More preferably, the second driving condition determining means calculates the driving condition-indicative parameter for comparison with the plurality of reference values by the use of a single neural network.

Alternatively, the second driving condition-determining means includes first driving condition-indicative parameter-calculating means for calculating a first driving condition-indicative parameter which represents the driving condition of the driver more accurately when the driving condition of the driver is close to abnormality, based on the driving condition-indicative data by the use of a first neural network, second driving condition-indicative parameter-calculating means for calculating a second driving condition-indicative parameter which represents the driving condition of the driver more accurately when the driving condition of the driver is close to normality, based on the driving condition-indicative data by the use of a second neural network, abnormal region-determining means for comparing the first driving condition-indicative parameter with an abnormality-determining reference value to determine whether the degree of normality of the driving condition of the driver belongs to the abnormal region, and normal region-determining means for comparing the second driving condition-indicative parameter with a normality-determining reference value to determine whether the degree of normality of the driving condition of the driver belongs to the normal region.

Further preferably, when the normal region-determining means does not determine that the degree of normality of the driving condition of the driver belongs to the normal region, the second driving condition-determining means determines whether the degree of normality of the driving condition of the driver is in a portion of the intermediate region close to the abnormal region or a portion of the intermediate region close to the normal region, based on the first driving condition-indicative parameter, the second driving condition-indicative parameter, and a predetermined reference value for determining the intermediate region.

Preferably, the driving condition-detecting means includes means for calculating meandering amount data representative of an amount of meandering of the vehicle as the driving condition-indicative data.

More preferably, the driving condition-detecting means includes behavior amount-detecting means for detecting a behavior amount of the vehicle related to a yawing motion of the vehicle or a lateral motion of the vehicle, vehicle speed-detecting means for detecting traveling speed of the vehicle, behavior reference value-setting means for setting a behavior reference value based on changes in the behavior amount, and lateral deviation behavior amount-calculating means for calculating a lateral deviation behavior amount of the vehicle, based on the behavior amount, the traveling speed of the vehicle, and the behavior reference value.

Further preferably, the driving condition-detecting means calculates a time-integrated value of an absolute value of the lateral deviation behavior amount of the vehicle as the meandering amount data.

Alternatively, the driving condition-detecting means calculates a standard deviation of the lateral deviation behavior amount as the meandering amount data.

Alternatively, the driving condition-detecting means calculates a difference between a maximum value of the lateral deviation behavior amount and a minimum value of the lateral deviation behavior amount over a predetermined time period, as the meandering amount data.

The above and other objects, features, and advantages of the invention will become more apparent from the following detailed description taken in conjunction with the accompanying drawings.

BRIEF DESCRIPTION OF THE DRAWINGS

FIGS. 3A to 3E are diagrams showing changes in detected and calculated parameters, which are used for calculating an amount of meandering of the vehicle, in which:

DETAILED DESCRIPTION

The invention will now be described in detail with reference to the drawings showing a presently preferred embodiment thereof.

Figure 1:
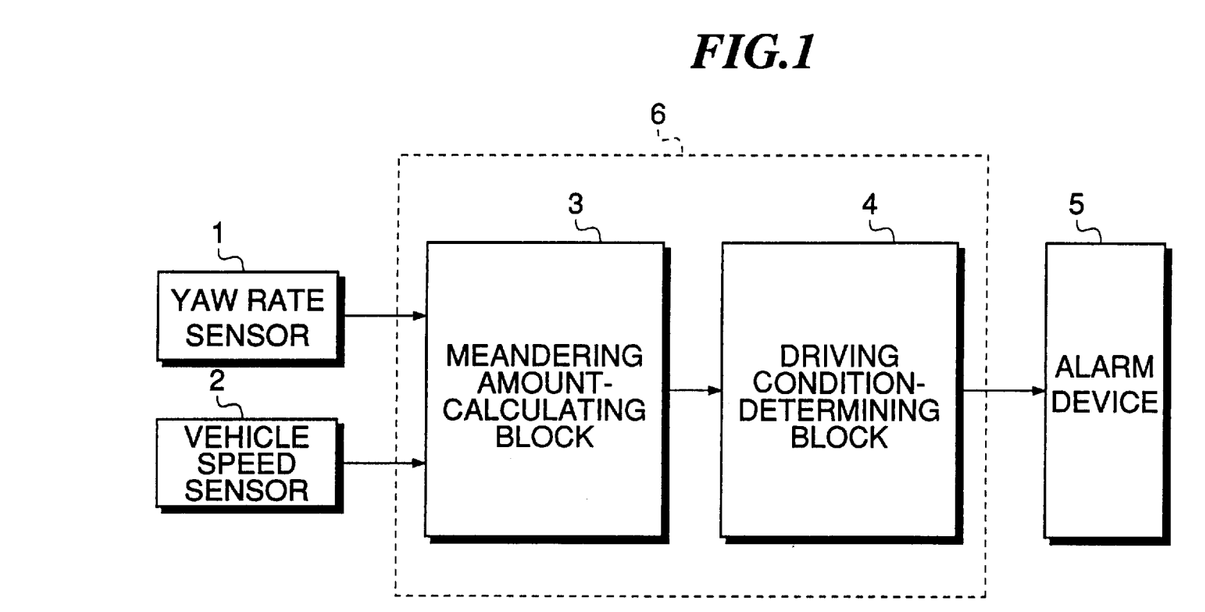
FIG. 1 is a block diagram showing the arrangement of a driving condition-monitoring apparatus for an automotive vehicle, according to a preferred one embodiment of the invention.

Referring first to FIG. 1, there is shown the arrangement of a driving condition-monitoring apparatus for an automotive vehicle, according to an the presently preferred embodiment of the invention. The apparatus is installed on a vehicle which is driven by a prime mover, such as an internal combustion engine and an electric motor, and is equipped with a steering handle or wheel. The vehicle is provided with a yaw rate sensor 1 for detecting the yaw rate YR of the vehicle, and a vehicle speed sensor 2 for detecting the traveling speed of the vehicle (vehicle speed V), and the sensors 1 and 2 supply electric signals indicative of the sensed yaw rate and the sensed vehicle speed, respectively, to a meandering amount-calculating block 3. The meandering amount-calculating block 3 calculates an amount of meandering (hereinafter referred to as "the meandering amount") X of the automotive vehicle as a parameter indicative of the driving condition of the driver, based on the yaw rate YR and the vehicle speed V detected, respectively, by the sensors 1, 2, and delivers the result of the calculation to a driving condition-determining block 4. The driving condition-determining block 4 determines a driving condition of the driver, based on the meandering amount X, and drives an alarm device 5 in response to the result of the determination. The alarm device 5 may be formed e.g. by a lamp, a buzzer, or a voice generator.

In the present embodiment, the meandering amount-calculating block 3 and the driving condition-determining block 4 are implemented by an electronic control unit (ECU) 6 including a central processing unit (CPU), a memory device, input/output circuits, etc.

Figure 2:
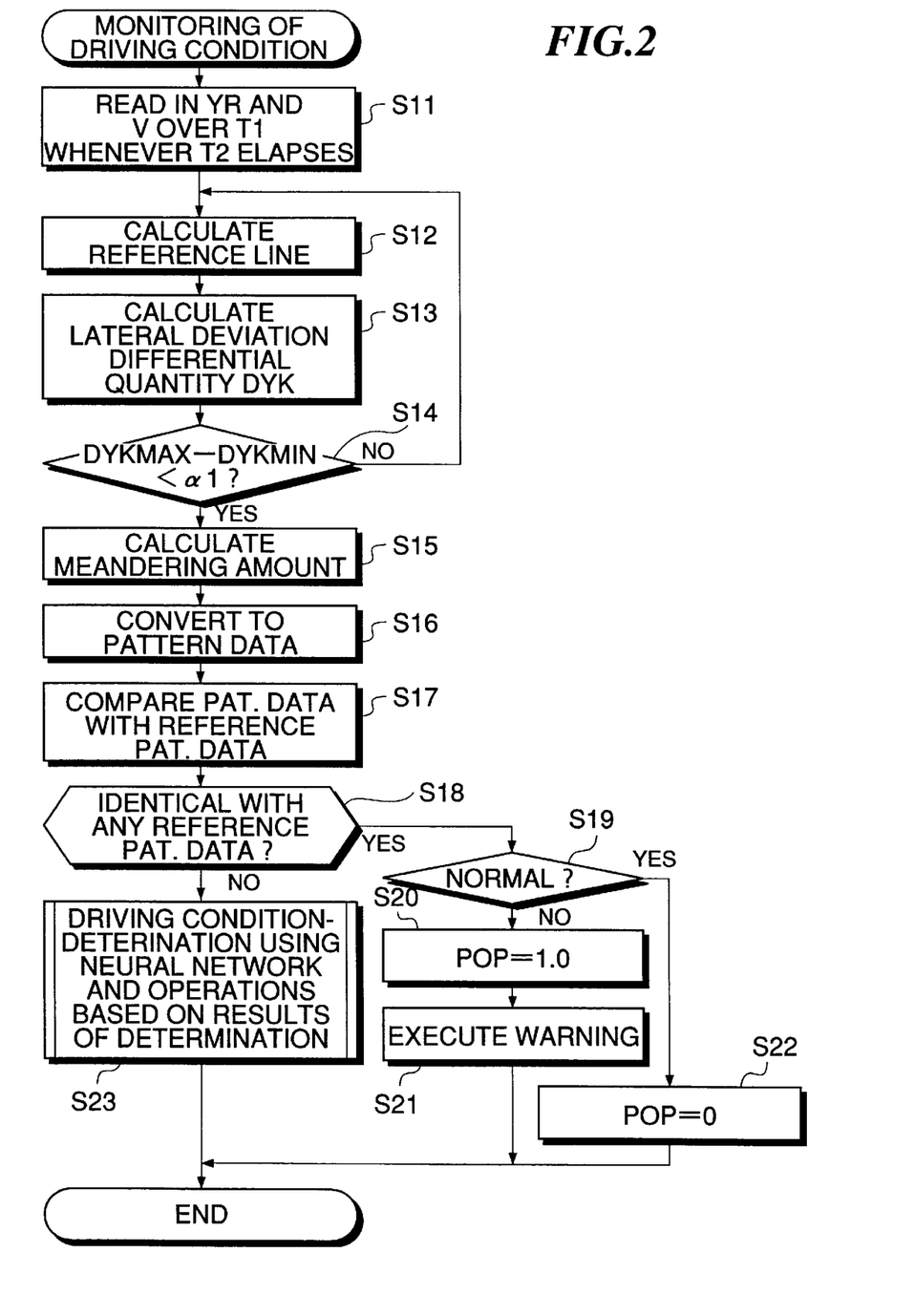
FIG. 2 is a flowchart showing a program for carrying out a driving condition-monitoring process in which the driving condition of the driver is determined and warning is carried out, depending upon a result of the determination.

FIG. 2 shows a program for carrying out a driving condition-monitoring process which is executed by the CPU of the ECU 6 to calculate a reference line or a lane along which the vehicle should travel as well as a parameter (meandering amount X1) indicative of a deviation of the vehicle from the reference line, based on the sensed yaw rate YR and vehicle speed V, and then determine a driving condition of the driver based on the calculated meandering amount X1.

First, at a step S11, data of the yaw rate YR and the vehicle speed V detected over a predetermined time period T1 (e.g.

30 seconds) before the present time are read in whenever a predetermined time period T2 (e.g. 10 seconds) elapses. Then, the reference line and a lateral deviation differential quantity DYK are calculated at steps S12 and S13, respectively.

Figure 3A:
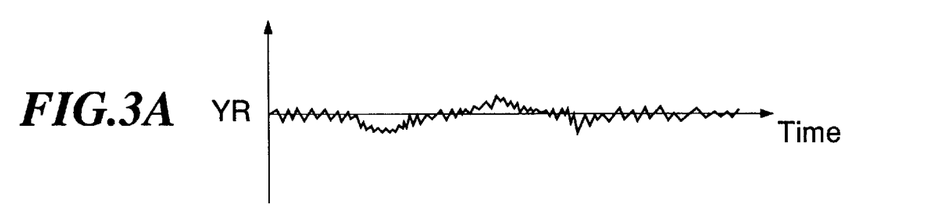
FIG. 3A shows changes in a yaw rate YR.
Figure 3B:
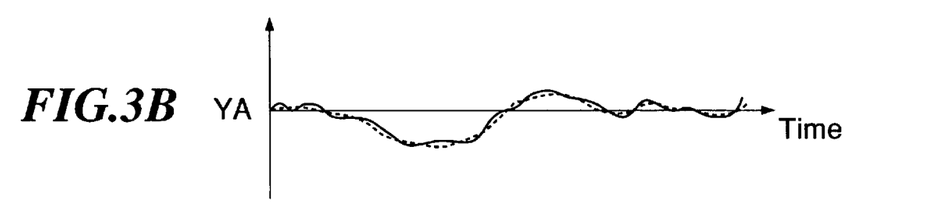
FIG. 3B shows changes in a yaw angle YA.

The reference line and the lateral deviation differential quantity DYK are calculated in the following manner:

First, the input yaw rate YR (FIG. 3A) is time-integrated into a yaw angle YA (FIG. 3B), and further the reference line (indicated by the broken line in FIG. 3B) is calculated, based on the yaw angle YA. Specifically, this calculation is carried out by a least-square method, which is well known, in the following manner:

Let it be assumed, e.g. that yaw angle values YA1, YA2, and YA3 were obtained at time points t1, t2, and t3, respectively. The reference line can be approximated by the following linear expressions:

$$YA1 = b1 + b2t1 + e1$$
$$YA2 = b1 + b2t2 + e2$$
$$YA3 = b1 + b2t3 + e3$$

where e1 to e3 represent residuals, and terms b1 and b2 are determined such that the sum of the squares of the residuals e1 to e3 becomes the minimum. The reference line can also be approximated by the following quadratic expressions:

$$YA1 = b1 + b2t1 + b3t1^2 + e1$$
$$YA2 = b1 + b2t2 + b3t2^2 + e2$$
$$YA3 = b1 + b2t3 + b3t3^2 + e3$$

where terms b1 to b3 are determined such that the sum of the squares of the residuals e1 to e3 becomes the minimum.

Further, the reference line can be approximated by the following cubic expressions:

$$YA1 = b1 + b2t1 + b3t1^2 + b4t1^3 + e1$$
$$YA2 = b1 + b2t2 + b3t2^2 + b4t2^3 + e2$$
$$YA3 = b1 + b2t3 + b3t3^2 + b4t3^3 + e3$$

where terms b1 to b4 are determined such that the sum of the squares of the residuals e1 to e3 becomes the minimum.

When the number of sampled data items is larger, higher degree expressions are further employed to carry out more accurate approximation.

Figure 3C:
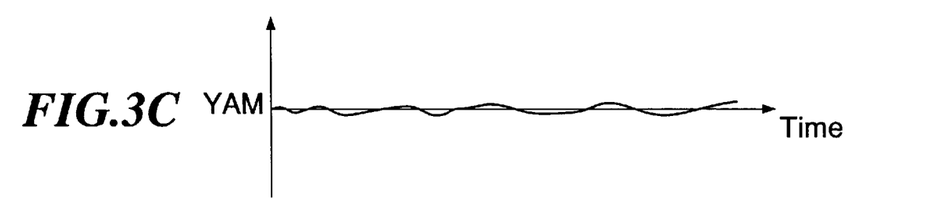
FIG. 3C shows changes in a modified yaw angle YAM.
Figure 3D:
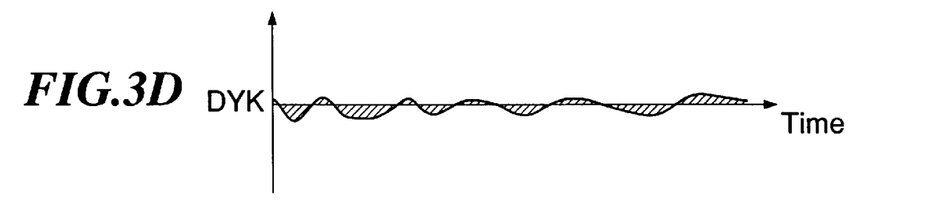
FIG. 3D shows changes in a lateral deviation differential quantity DYK.

In the present embodiment, first, the reference line is determined by the use of the linear expressions, and then a modified yaw angle YAM (FIG. 3C) is calculated by subtracting a reference yaw angle corresponding to the reference line from the determined yaw angle YA. Further, the lateral deviation differential quantity DYK (FIG. 3D) is calculated by applying the modified yaw angle YAM and the vehicle speed V to the following equation:

$$DYK = V \times sin(YAM)$$

Referring back to FIG. 2, at the next step S14, it is determined whether or not the difference between the maximum value DYKMAX of the lateral deviation differential quantity DYK and the minimum value DYKMIN of the same is smaller than a predetermined value $\alpha$ 1. If (DYKMAX−DYKMIN)$\geq \alpha$ 1 holds, the program returns to the step S12, wherein the order of approximation of the reference line is increased by one order to again calculate the reference line. This procedure is repeatedly carried out until the answer to the question of the step S14 becomes affirmative (YES).

Alternatively, the calculation of the reference line may be terminated when the order of approximation has reached a predetermined value, even if (DYKMAX−DYKMIN) $\geq \alpha$ 1 holds.

If (DYKMAX−DYKMIN)<$\alpha$ 1 holds at the step S14, the program proceeds to a step S15, wherein the meandering amount X is calculated. The meandering amount X is calculated, e.g. as the sum of the hatched areas (a value obtained by time-integrating the absolute value of the lateral deviation differential quantity DYK) shown in FIG. 3D. Alternatively, a standard deviation of the DYK value or the difference between the maximum value of the DYK value and the minimum value of the same may be used as the meandering amount X.

Figure 3E:
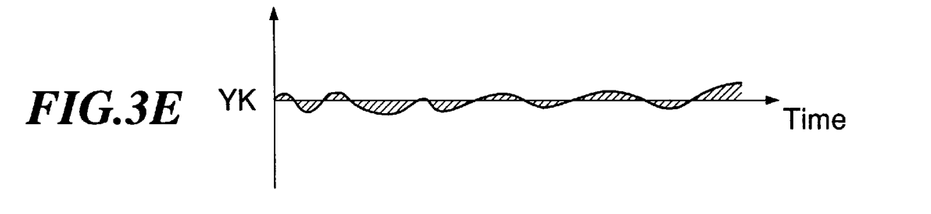
FIG. 3E shows changes in a lateral deviation YK.

As another alternative to the above, a value obtained by time-integrating the absolute value of a lateral deviation YK (the sum of the hatched areas shown in FIG. 3E) may be used as the meandering amount X. More specifically, the lateral deviation YK may be determined by further time-integrating the lateral deviation differential quantity DYK at the step S13, and then the reference line may be updated at the step S14 until the difference between the maximum value YKMAX of the lateral deviation YK and the minimum value YKMIN of the same becomes smaller than a predetermined value $\alpha$ 2. Then, the absolute value of the thus obtained lateral deviation YK may be time-integrated to obtain the above-mentioned value as the meandering amount data X. A standard deviation of the lateral deviation YK or the difference between the maximum value YKMAX and the minimum value YKMIN of the lateral deviation YK may be also used as the meandering amount X.

Figure 4:
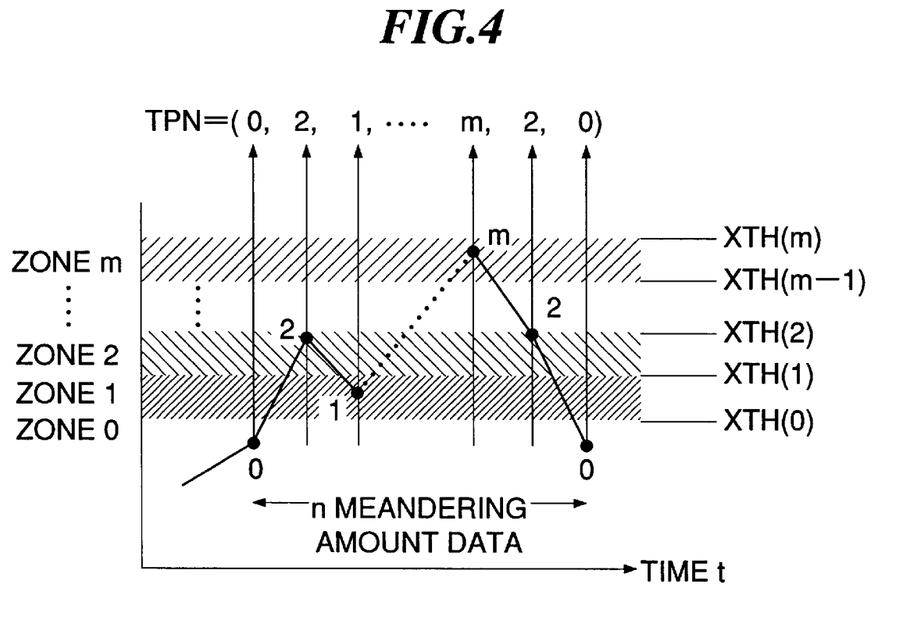
FIG. 4 is a diagram which is useful in explaining a manner of converting data of the meandering amount to pattern data.

At a step S16, the meandering amount X is converted to pattern data. More specifically, first, n pieces of meandering amount data (X1, X2, . . . Xn) are obtained over a predetermined time period TN (e.g. 70 seconds), and then, as shown in FIG. 4, a determination as to which of zones 0 to m (m represents an integer equal to or larger than 1) each meandering amount data Xj (j=1 to n) belongs to is made by comparing the meandering amount data Xj with reference values XTH (0) to XTH (m), to thereby obtain pattern data PTN formed by zone numbers corresponding respectively to the n pieces of meandering data. The zone which the meandering amount data Xj belongs to is determined, for instance, such that when Xj<XTH (0) holds, the meandering amount Xj belong to zone 0, while when XTH (0)$\leq$Xj<XTH (1) holds, the meandering amount Xj belongs to zone 1.

Then, at a step S17, the pattern data PTN is compared with reference pattern data PTNDET for determining the driving condition of the driver. The reference pattern data PTNDET include a plurality of normality-indicative pattern data PTNDETOK which are considered to evidently indicate respective normal driving conditions of the driver, and a plurality of abnormality-indicative pattern data PTNDETNG which are considered to evidently indicate respective abnormal driving conditions of the driver. These data are stored in the memory device of the ECU 6 in advance. The normality-indicative pattern data PTNDETOK include e.g. pattern data in which all the n pieces of meandering amount data belong to zone 0, or pattern data in which all the n pieces of meandering amount data belong to zone 0 or 1 and at the same time consecutive ones of them do not belong to zone 1. On the other hand, the abnormality-indicative pattern data PTNDETNG include e.g. pattern data in which assuming that m=2 holds, for instance, half or more of the n pieces of meandering amount data belong to zone 2 and at the same time consecutive ones of the half or more meandering amount data belong to zone 2.

The comparison of the pattern data PTN with the reference pattern data PTNDET can be carried out at a high speed, and hence it is possible to quickly determine that the driving condition of the driver is normal or abnormal.

At the following step S18, it is determined whether or not the detected pattern data PTN is identical with any one of the reference pattern data PTNDETOK and PTNDETNG. If the detected pattern data PTN is identical with any one of the reference pattern data, it is determined at a step S19 whether or not the reference pattern data identical with the detected pattern data PTN is one of the normality-indicative pattern data PTNDETOK. If it is determined that the former is the latter, a driving condition-indicative parameter POP indicative of the driving condition of the driver is set to "0" at a step S22, followed by terminating the program. On the other hand, if the reference pattern data identical with the detected pattern data PTN is one of the abnormality-indicative pattern data PTNDETNG, the driving condition-indicative parameter POP is set to "1.01" at a step S20, and then the program proceeds to a step S21, wherein warning is given. More specifically, a warning lamp, not shown, is flickered and at the same time an alarm is sounded at large volume.

If the detected pattern data PTN is not identical with any one of the normality-indicative pattern data PTNDETOK and the abnormality-indicative pattern data PTNDETNG at the step S18, the program proceeds to a step S23, wherein the driving condition-indicative parameter POP is calculated by the use of a neural network, and warning or other operation is executed based on the result of the calculation.

Figure 5:
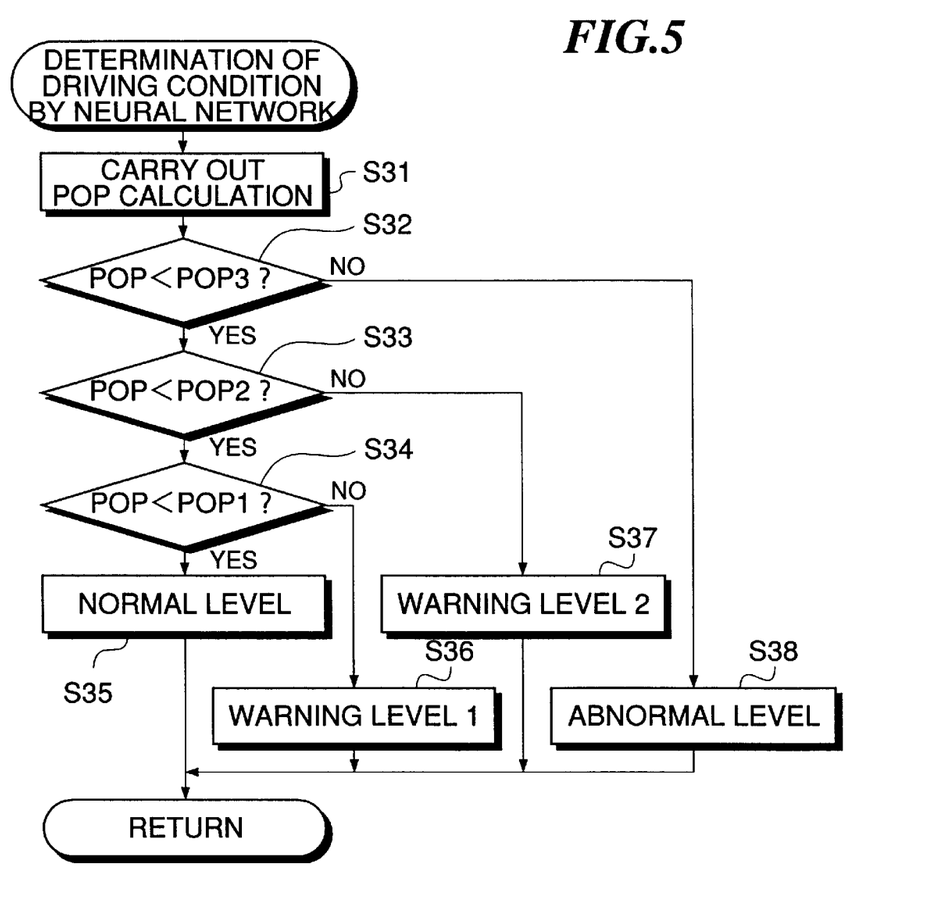
FIG. 5 is a flowchart showing a program for determining the driving condition of the driver by the use of a neural network.

FIG. 5 shows a subroutine for carrying out the process executed at the step S23 in FIG. 2. First, at a step S31, the driving condition-indicative parameter POP is calculated by the use of the neural network.

Figure 6:
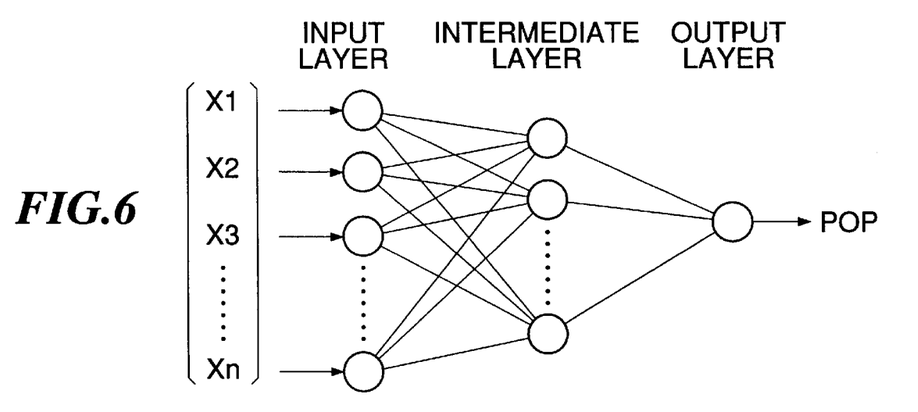
FIG. 6 is a diagram showing a structure of the neural network.

FIG. 6 shows the structure of the neural network employed in the present embodiment. The neural network employed in the present embodiment has a three-layer structure formed of an input layer, an intermediate layer, and an output layer, and uses a known learning algorithm called "Back Propagation (hereinafter referred to as "BP")".

As shown in FIG. 6, pieces of information input to units or nodes (i.e. neurons) of the input layer are meandering amount data Xj (j=1 to n). These pieces of information are weighted by weights constituting a connection matrix, and input to units or nodes of the intermediate layer. An output from each of the units of the intermediate layer is determined e.g. by a sigmoidal function. Similarly to the data processing carried out when data items are transferred from the input layer to the intermediate layer, outputs from the units of the intermediate layer weighted by weights constituting a connection matrix are input to the output layer, and the output layer delivers the resulting data as the driving condition-indicative parameter POP. A POP value, which is determined by the sigmoidal function, falls between "0" and "1.0", and a larger POP value indicates a more degraded driving condition of the driver.

Each element (weight) of the connection matrix is determined by the BP learning algorithm such that a total error function of the output from the output layer obtained when meandering amount data obtained by actually driving the vehicle in a meandering manner are applied to the neural network as input data is minimized with respect to a desired POP value indicative of the meandering of the vehicle as teaching data (teaching signal).

The use of the driving condition-indicative parameter POP thus obtained makes it possible to accurately grasp various driving conditions in a gray area between normality and abnormality.

Figure 7:
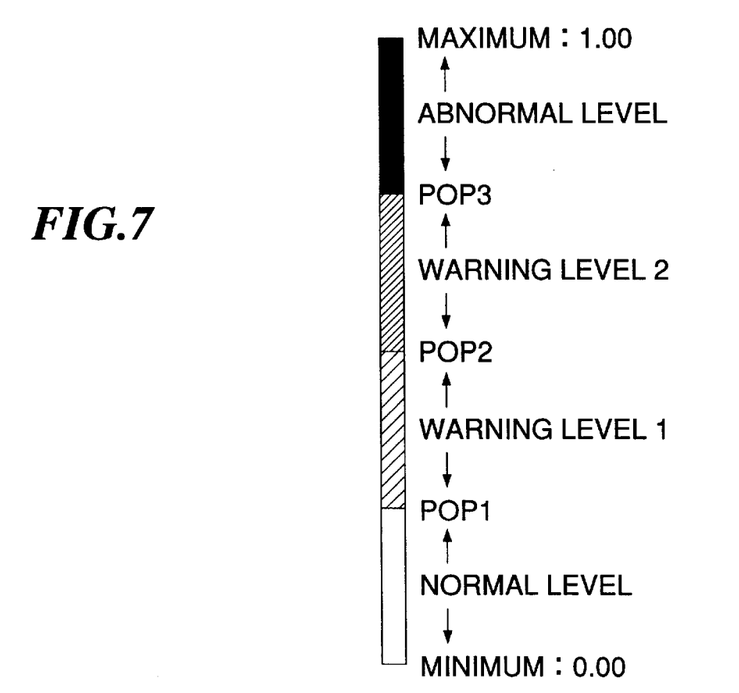
FIG. 7 is a diagram which is useful in explaining the relationship between values of a driving condition-indicative parameter and results of the determination of the driving condition of the driver.

Referring again to FIG. 5, at steps S32 to S34, it is determined which level the calculated driving condition-indicative parameter POP belongs to, i.e. "abnormal level", "warning level 2", "warning level 1", or "normal level" as shown in FIG. 7. In FIG. 7, first to third predetermined reference values POP1, POP2 and POP3 are in the relationship of POP1<POP2<POP3 (e.g. POP1=0.25, POP2=0.5, and POP3=0.75). If POP≧POP3 holds at the step S32, it is determined at a step S38 that the driving condition of the driver is abnormal. If POP2≦POP<POP3 holds at the step S33, it is determined at a step S37 that the driving condition of the driver is at the warning level 2 (warning level close to abnormality). Further, if POP1≦POP<POP2 holds at the step S34, it is determined at a step S36 that the driving condition of the driver is at the warning level 1 (warning level close to normality), whereas if POP<POP1 holds at the step S34, it is determined at a step S35 that the driving condition of the driver is normal.

If the driving condition of the driver is determined to be at the warning level 2, warning is given e.g. by lighting the warning lamp in red and at the same time sounding the alarm at small volume. If the driving condition is determined to be at the warning level 1, warning is given e.g. by lighting the warning lamp in yellow, but in this case sounding no alarm. Further, if the driving condition of the driver is determined to be normal, the warning lamp is lit in green, for instance.

As described above, according to the present embodiment, an evidently normal or abnormal driving condition is determined by comparing the pattern data PTN with the reference pattern data PTNDET, whereas when the driving condition cannot be determined to be either normal or abnormal, the driving condition-indicative parameter POP is calculated by the use of the neural network to thereby determine the driving condition of the driver. This makes it possible to accurately grasp the driving condition and at the same time quickly determine abnormality of the driving condition.

Figure 8:
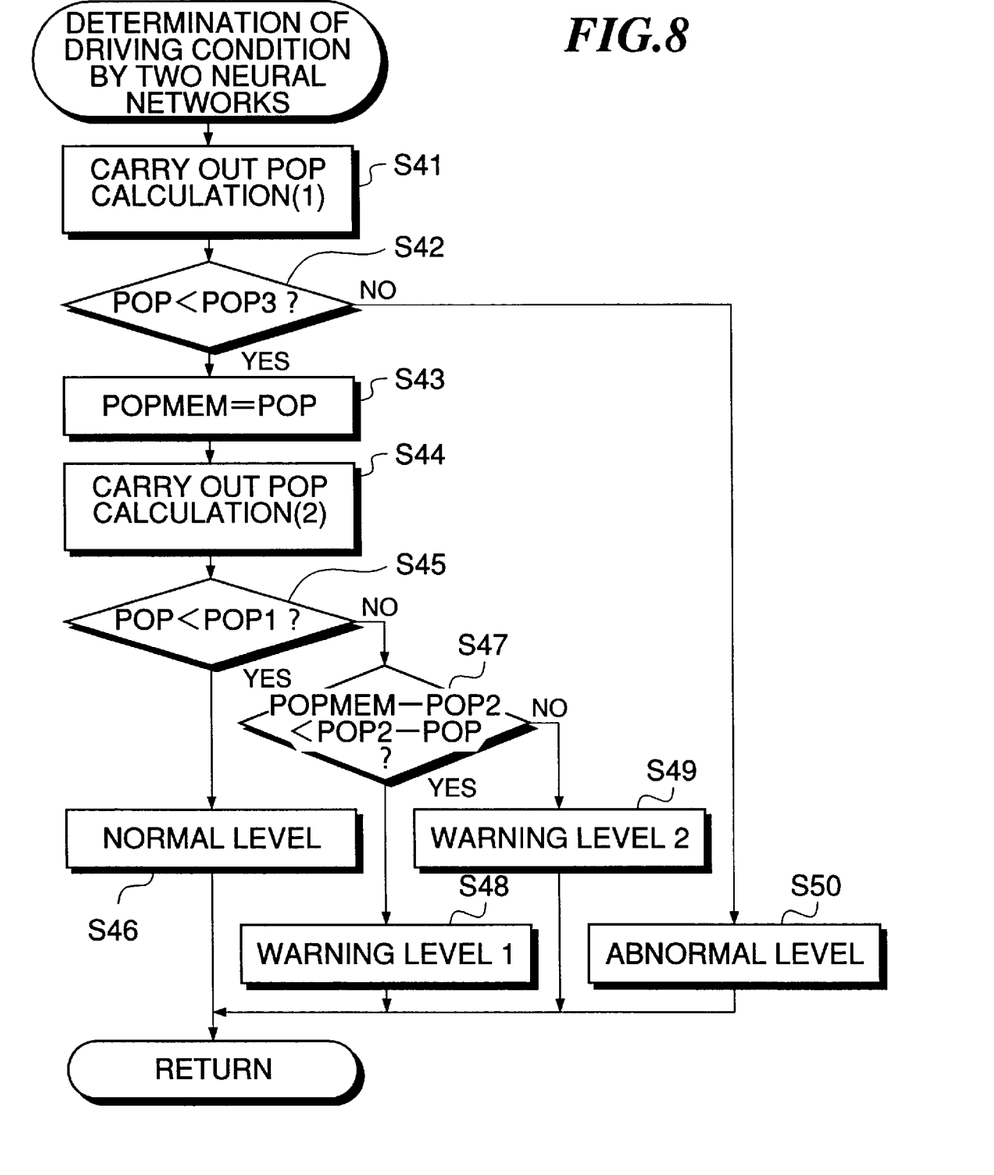
FIG. 8 is a flowchart showing a variation of the FIG. 5 program using two neural networks instead of one.

As a variation of the present embodiment, the process at the step S23 in FIG. 2 may be carried out by a subroutine shown in FIG. 8 instead of the one shown in FIG. 5. In the FIG. 8 subroutine, the driving condition-indicative parameter POP is calculated by the use of two neural networks.

First, at a step S41 in FIG. 8, a first calculation of the driving condition-indicative parameter POP (POP calculation (1)) is executed. Although the POP calculation (1) is basically similar to the calculation executed at the step S31 in FIG. 5 in that a neural network is used, the neural network employed here is configured in a manner particularly suitable for determining driving conditions close to the level "abnormal".

At the following step S42, it is determined whether or not the calculated POP value is smaller than the third predetermined reference value POP3. If POP≧POP3 holds, it is determined at a step S50 that the driving condition of the driver is abnormal, whereas if POP<POP3 holds, the present POP value is stored as a stored value POPMEM at a step S43, and a second calculation of the driving condition-indicative parameter POP (POP calculation (2)) is executed at a step S44.

Although the POP calculation (2) is also basically similar to the calculation executed at the step S31 in FIG. 5 in that a neural network is used, the neural network employed here is configured in a manner particularly suitable for determining driving conditions close to the level "normal".

At the following step S45, it is determined whether or not the POP value calculated at the step S44 is smaller than the first predetermined reference value POP1. If POP<POP1 holds, it is determined at a step S46 that the driving condition of the driver is normal. On the other hand, if POP≧POP1 holds, the program proceeds to a step S47, wherein it is determined whether or not the difference between the stored value POPMEM and the second predetermined reference value POP2 (=POPMEM−POP2) is smaller than the difference between the second predetermined reference value POP2 and the POP value (=POP2−POP). If POPMEM−POP2<POP2−POP holds, it is determined at a step S48 that the driving condition of the driver is at the warning level 1, whereas if POPMEM−POP2≧POP2−POP holds, it is determined at a step S49 that the driving condition is at the warning level 2.

Since the FIG. 8 subroutine employs two neural networks, it is possible to reduce the size of each network. That is, in the FIG. 5 subroutine, forty to fifty units or nodes are needed to form the intermediate layer of the neural network, while in the present routine, each of the networks needs only ten to twenty units or nodes for the intermediate layer. Further, since in the FIG. 8 subroutine, determinations of "abnormal level", "normal level", and "warning levels 1 or 2" are carried out in the mentioned order, it is possible to determine an abnormal driving condition more quickly compared with the process executed in FIG. 5, though the size of the program executed by the CPU is larger.

It should be noted that the present invention is not limited to the above described embodiment, but various changes and modifications may be made thereto. For instance, although in the above described embodiment, the meandering amount data indicative of the behavior of the vehicle is used as a parameter for determining driving conditions of the driver, this is not limitative, but data indicative of driving operations and/or conditions (posture, body temperature, etc.) of the driver, such as the frequency of operations of the steering wheel and an accelerator pedal of the vehicle, periodic changes in the position of an upper part of the driver's body, and information on the driver's body including an electric potential on the skin, the electroencephalogram, the countenance, and the body temperature may be used.

Further, instead of converting the meandering amount data to the pattern data for comparison of the pattern data with reference pattern data (at the steps S16 to S18 in FIG. 2), a method may be employed in which each meandering amount data is compared with a predetermined reference value to thereby determine whether or not the determination by the neural network should be carried out, depending upon the result of the comparison.

Still further, although in the above described embodiment, the driver is cautioned by appealing to his or her sight and/or hearing, this is not limitative, but means for directly applying physical forces or stimulations on the driver may be employed, e.g. by vibrating the driver's seat, or by applying tension to the seat belt, or by emitting a perfume, or by changing the operating condition of an air conditioner provided in the vehicle, or by opening windows of the vehicle. This ensures that the driver is cautioned of his degraded driving ability in a more positive manner.

Also, when it is determined that the driving condition of the driver is abnormal, the output of the engine may be progressively reduced e.g. by progressively decreasing the amount of fuel supplied to the engine which drives the vehicle.

Further, although in the above described embodiment, the yaw rate is detected by the yaw rate sensor 1, this is not limitative, but the yaw rate may be calculated based on outputs from wheel speed sensors and the vehicle speed sensor, or based on outputs from a steering angle sensor for detecting the steering angle of the steering wheel and a lateral acceleration sensor, etc.

Even further, although in the above described embodiment, the reference line is estimated from the yaw angle YA, this is not limitative, but it may be estimated from the yaw rate YR, or from the lateral deviation YK.

The scope of the invention is indicated by the appended claims, rather than by the foregoing description of the presently preferred embodiments.

What is claimed is:

1. A driving condition-monitoring apparatus for an automotive vehicle, for monitoring a driving condition of a driver of said automotive vehicle, the apparatus comprising:

driving condition-detecting means for detecting at least one of behavior of said vehicle, a driving operation of said driver, and at least one condition of said driver to thereby generate driving condition-indicative data indicative of said driving condition of said driver;

first driving condition-determining means for determining whether said driving condition of said driver is abnormal, based on said driving condition-indicative data generated by said driving condition-detecting means;

second driving condition-determining means for determining a degree of normality of said driving condition of said driver, by inputting a plurality of pieces of said driving condition-indicative data to a neural network when said first driving condition-determining means does not determine that said driving condition of said driver is abnormal; and control means for carrying out at least one of warning and control of said vehicle depending upon a result of the determination by said first driving condition-determining means and said degree of normality of said driving condition of said driver determined by said second driving condition-determining means.

2. A driving condition-monitoring apparatus according to claim 1, wherein said first driving condition-determining means determines whether said driving condition of said driver is abnormal, based on a distribution of said plurality of pieces of said driving condition-indicative data.

3. A driving condition-monitoring apparatus according to claim 1, wherein when said first driving condition-determining means does not determine that said driving condition of said driver is abnormal, said first driving condition-determining means further determines whether said driving condition of said driver is normal, based on said driving condition-indicative data generated by said driving condition-detecting means, said determination of said degree of normality of said driving condition of said driver by said second driving condition-determining means being inhibited when said first driving condition-determining means has determined that said driving condition of said driver is either definitely normal or definitely abnormal.

4. A driving condition-monitoring apparatus according to claim 2, wherein when said first driving condition-determining means does not determine that said driving condition of said driver is abnormal, said first driving condition-determining means further determines whether said driving condition of said driver is normal, based on said driving condition-indicative data generated by said driving condition-detecting means, said determination of said degree of normality of said driving condition of said driver by said second driving condition-determining means being inhibited when said first driving condition-determining means has determined that said driving condition of said driver is either definitely normal or definitely abnormal.

5. A driving condition-monitoring apparatus according to claim 4, wherein said first driving condition-determining means forms pattern data indicative of said distribution of said plurality of pieces of driving condition-indicative data, and compares said pattern data thus formed with predetermined abnormality-indicative pattern data indicative of respective abnormal driving conditions of said driver and predetermined normality-indicative pattern data indicative of respective normal driving conditions of said driver, said first driving condition-determining means determining that said driving condition of said driver is abnormal when said formed pattern data is identical with any of said predetermined abnormality-indicative pattern data, and determining that said driving condition of said driver is normal when said formed pattern data is identical with any of said predetermined normality-indicative pattern data.

6. A driving condition-monitoring apparatus according to claim 1, wherein said second driving condition-determining means calculates a driving condition-indicative parameter by said neural network, based on said driving condition-indicative data and compares said driving condition-indicative parameter with a plurality of reference values to thereby determine which of an abnormal region, an intermediate region, and a normal region said degree of normality of said driving condition of said driver belongs.

7. A driving condition-monitoring apparatus according to claim 6, wherein said second driving condition determining means calculates said driving condition-indicative parameter for comparison with said plurality of reference values by the use of a single neural network.

8. A driving condition-monitoring apparatus according to claim 6, wherein said second driving condition-determining means includes first driving condition-indicative parameter-calculating means for calculating a first driving condition-indicative parameter which represents said driving condition of said driver more accurately when said driving condition of said driver is close to abnormality, based on said driving condition-indicative data by the use of a first neural network, second driving condition-indicative parameter-calculating means for calculating a second driving condition-indicative parameter which represents said driving condition of said driver more accurately when said driving condition of said driver is close to normality, based on said driving condition-indicative data by the use of a second neural network, abnormal region-determining means for comparing said first driving condition-indicative parameter with an abnormality-determining reference value to determine whether said degree of normality of said driving condition of said driver belongs to said abnormal region, and normal region-determining means for comparing said second driving condition-indicative parameter with a normality-determining reference value to determine whether said degree of normality of said driving condition of said driver belongs to said normal region.

9. A driving condition-monitoring apparatus according to claim 8, wherein when said normal region-determining means does not determine that said degree of normality of said driving condition of said driver belongs to said normal region, said second driving condition-determining means determines whether said degree of normality of said driving condition of said driver is in a portion of said intermediate region close to said abnormal region or a portion of said intermediate region close to said normal region, based on said first driving condition-indicative parameter, said second driving condition-indicative parameter, and a predetermined reference for determining said intermediate region.

10. A driving condition-monitoring apparatus according to claim 1, wherein said driving condition-detecting means includes means for calculating meandering amount data representative of an amount of meandering of said vehicle as said driving condition-indicative data.

11. A driving condition-monitoring apparatus according to claim 10, wherein said driving condition-detecting means includes behavior amount-detecting means for detecting a behavior amount of said vehicle related to a yawing motion of said vehicle or a lateral motion of said vehicle, vehicle speed-detecting means for detecting traveling speed of said vehicle, behavior reference value-setting means for setting a behavior reference value based on changes in said behavior amount, and lateral deviation behavior amount-calculating means for calculating a lateral deviation behavior amount of said vehicle, based on said behavior amount, said traveling speed of said vehicle, and said behavior reference value.

12. A driving condition-monitoring apparatus according to claim 11, wherein said driving condition-detecting means calculates a time-integrated value of an absolute value of said lateral deviation behavior amount of said vehicle as said meandering amount data.

13. A driving condition-monitoring apparatus according to claim 11, wherein said driving condition-detecting means calculates a standard deviation of said lateral deviation behavior amount as said meandering amount data.

14. A driving condition-monitoring apparatus according to claim 11, wherein said driving condition-detecting means calculates a difference between a maximum value of said lateral deviation behavior amount and a minimum value of said lateral deviation behavior amount over a predetermined time period, as said meandering amount data.

\* \* \* \* \*

UNITED STATES PATENT AND TRADEMARK OFFICE
CERTIFICATE OF CORRECTION

PATENT NO   : 5,821,860
DATED       : 13 October 1998
INVENTOR(S) : Shintaro Yokoyama, Kouichi Kojima It is certified that error appears in the above-identified patent and that said Letters Patent is hereby corrected as shown below:

On the title page: Item [56] correct the Primary Examiner's name from "Mulien" to --Mullen--.

In FIG. 2, in the box labeled "S23", correct the spelling of "DETERINATION" to --DETERMINATION--.

Column 3, line 59, delete "one".

Column 6, line 45, change "belong" to --belongs--.

Column 7, line 19, change ""1.01"" to --"1.0"--;
line 39, after "Propagation" insert --"--; after ")" delete the quotation marks.

Column 12, line 16 (Claim 9, line 12), after "reference" insert --value--.

Signed and Sealed this

Thirtieth Day of March, 1999

Q. TODD DICKINSON

Attest:

Attesting Officer

Acting Commissioner of Patents and Trademarks